United States Patent
Patel et al.

(10) Patent No.: US 6,330,662 B1
(45) Date of Patent: Dec. 11, 2001

(54) APPARATUS INCLUDING A FETCH UNIT TO INCLUDE BRANCH HISTORY INFORMATION TO INCREASE PERFORMANCE OF MULTI-CYLCE PIPELINED BRANCH PREDICTION STRUCTURES

(75) Inventors: Sanjay Patel, Fremont; Adam Talcott, San Jose; Rajasekhar Cherabuddi, Cupertino, all of CA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/256,623

(22) Filed: Feb. 23, 1999

(51) Int. Cl.[7] ............................................. G06F 9/30
(52) U.S. Cl. .................................. 712/236; 712/234
(58) Field of Search ........................ 712/233–240, 712/206; 711/213, 220

(56) References Cited

U.S. PATENT DOCUMENTS

| | | | |
|---|---|---|---|
| 5,935,238 | * | 8/1999 | Talcott .................................. 712/206 |
| 5,948,100 | * | 9/1999 | Hsu et al. .............................. 712/238 |
| 6,035,392 | * | 3/2000 | Liptay et al. .......................... 712/236 |
| 6,101,577 | * | 8/2000 | Tran ...................................... 712/125 |
| 6,115,810 | * | 9/2000 | Patel ..................................... 712/239 |
| 6,167,506 | * | 12/2000 | Witt ...................................... 712/213 |

* cited by examiner

Primary Examiner—John F. Niebling
Assistant Examiner—Stacy A Whitmore
(74) Attorney, Agent, or Firm—Gunnison, McKay & Hodgson, L.L.P.; Philip J. McKay

(57) ABSTRACT

An instruction fetch unit for fetching instructions from an instruction cache of a processor. The fetch unit includes a next fetch address mechanism generating predicted next fetch addresses, the next fetch address mechanism generating a next fetch address for a fetch bundle over at least two cycles of the processor. The next fetch address mechanism determines the next fetch address based on whether a control transfer instruction from an intermediate set of fetched instructions is taken.

8 Claims, 9 Drawing Sheets

A = ADDRESS GENERATION STEP
I = ACCESS INSTRUCTION CACHE (I$) STEP

APPARATUS INCLUDING A FETCH UNIT TO INCLUDE BRANCH HISTORY INFORMATION TO INCREASE PERFORMANCE OF MULTI-CYLCE PIPELINED BRANCH PREDICTION STRUCTURES

BACKGROUND OF THE INVENTION

1. Field of the Invention

This invention relates in general to microprocessors, and more particularly, to branch prediction structures in a microprocessor which use branch history information to increase performance of multi-cycle branch prediction structures.

2. Relevant Background

To improve overall performance of modern processors, also called microprocessors, to execute instructions, processors use techniques including pipe lining, super scalar execution, speculative instruction execution, and out-of-order instruction issue to enable multiple instructions to be issued and executed each clock cycle. As used herein the term processor includes complex instruction set computers (CISC), reduced instruction set computers (RISC), and hybrids thereof.

Super scalar processors achieve higher performance by executing many instructions simultaneously at high frequencies. As cycle times for high performance processors decreases, the functions performed by the structures in the microprocessor need to be distributed over multiple cycles. However, information relating to the function must be obtained from the structures every cycle based on updated input per cycle. Accordingly, the coordination of data available at each cycle is critical to the proper operation of the processor. In particular, a processor which utilizes speculative instruction execution must be capable of accurately predicting the instructions to be speculatively executed so that the number of branch misdirections is reduced. In this way, the processor's performance is not adversely affected by excessive branch misdirections.

FIG. 1 illustrates, as an example, five cycles of a microprocessor (shown as cycles 1 to 5), wherein three cycles are required to obtain or "fetch" a set of instructions known as a "fetch bundle". For each fetch bundle of instructions obtained shown in FIG. 1, as an example, one cycle is required to generate the address, and two cycles are required to access the instruction cache (I$) to obtain the actual instructions of the bundle. As shown in FIG. 1, when the address generation step $A_1$, is complete during cycle 1, the next cycle (cycle 2) can begin generating the address for obtaining fetch bundle "a". This address generation step is shown as $A_a$. When the address generation step $A_a$ for fetch bundle "a" is complete at the end of cycle 2, on the next cycle (cycle 3) the address generation step for fetch bundle "b" can be commenced. As used herein, "z", "a", and "b" are fetch addresses corresponding to their respective fetch bundle.

The process shown in FIG. 1 assumes that the step of address generation only requires a single cycle to determine the next fetch address. In this sense, FIG. 1 is an ideal situation at reduced cycle times where at the end of cycle 1, the predictive decision as to the next fetch address is complete, and that information can be used at the beginning of cycle 2 for the address generation for fetch bundle "a". At the end of cycle 2, the predictive decision as to the next fetch address for fetch bundle "b" is completed and that information can be used to generate the address for fetch bundle "b" during cycle 3.

However, because of increased frequency of operation and greater complexity of pipelines within a processor, the decision as to the next fetch address can be a complex decision, and may be split over more than one cycle. Accordingly, what is needed is a method and apparatus for increasing the accuracy of multi-cycled, pipeline branch prediction structures.

SUMMARY OF THE INVENTION

In light of the above, therefore, according to one broad aspect of the invention, a method and apparatus of including branch history to increase accuracy of multi-cycled, pipeline branch prediction structures is disclosed. In particular, an instruction fetch unit for fetching instructions from an instruction cache of a processor is disclosed. The fetch unit includes a next fetch address mechanism generating predicted next fetch addresses, the next fetch address mechanism generating a next fetch address for a fetch bundle over at least two cycles of the processor. The next fetch address mechanism determines the next fetch address based on whether a control transfer instruction from an intermediate set of fetched instructions is taken.

According to another broad aspect of the present invention, a processor is disclosed that executes coded instructions including an instruction scheduling unit receiving the coded instructions and issuing the received instruction for execution. An instruction execution unit generates data accesses in response to the issued instructions. The processor includes an instruction fetch unit for fetching instructions from an instruction cache of a processor. The fetch unit includes a next fetch address mechanism generating predicted next fetch addresses, the next fetch address mechanism generating a next fetch address for a fetch bundle over at least two cycles of the processor. The next fetch address mechanism determines the next fetch address based on whether a control transfer instruction from an intermediate set of fetched instructions is taken.

A computer system incorporating the features of the present invention is also disclosed.

The foregoing and other features, utilities and advantages of the invention will be apparent from the following more particular description of a preferred embodiment of the invention as illustrated in the accompanying drawings.

DETAILED DESCRIPTION OF THE PREFERRED EMBODIMENTS

As will be explained below, the present invention provides a next fetch address mechanism which determines the next fetch address based on whether a control transfer instruction from an intermediate set of fetched instructions is taken. As used herein, the term "control transfer instruction" includes instructions which alter the sequential program order, such as branch instructions or the like, including conditional branches which are taken or not taken, unconditional branches which are always taken, and a return which is always taken. Using the structure of the present invention, the instruction cache I$ of a processor can be accessed on every cycle, and a multi-cycle next fetch address table is incorporated into a branch prediction scheme using per cycle branch prediction information.

Figure 1:
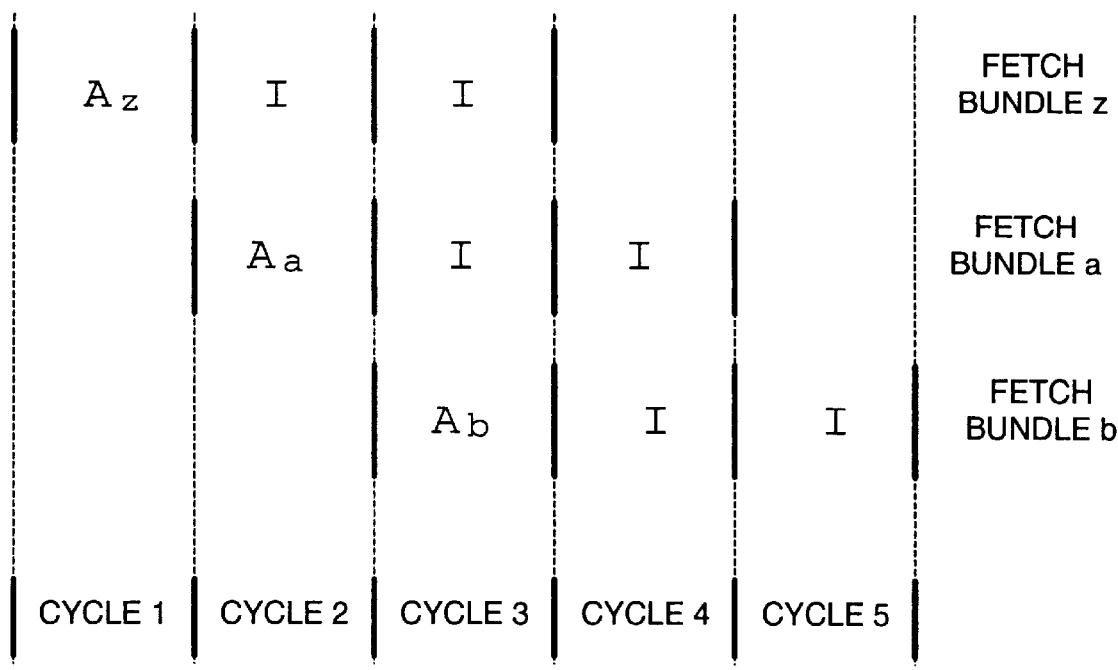
FIG. 1 illustrates the address generation steps and instruction cache access steps to obtain a plurality of instruction fetch bundles over five cycles of a microprocessor.
Figure 2:
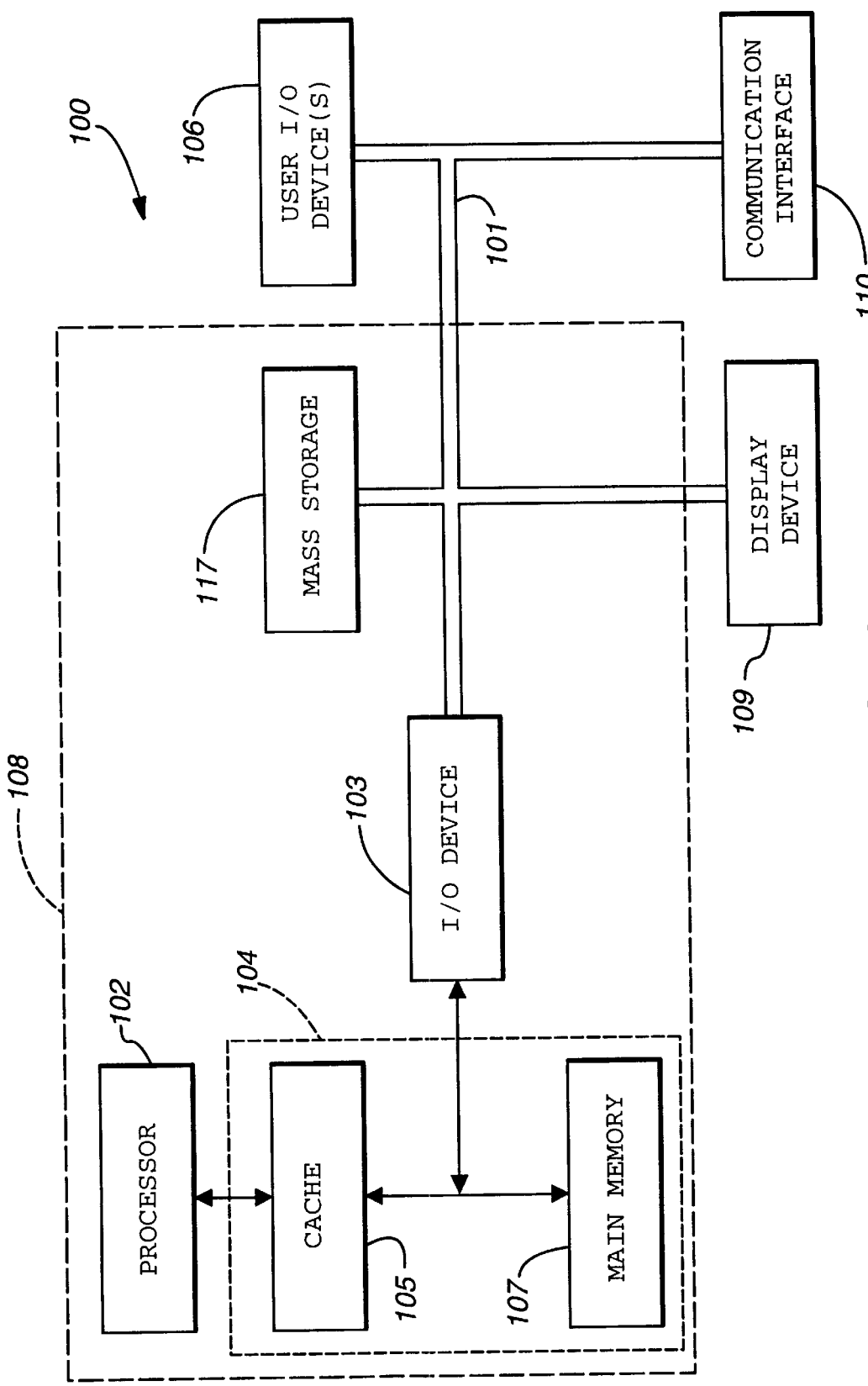
FIG. 2 shows in block diagram form a computer system in accordance with one embodiment of the present invention.

Processor architectures can be represented as a collection of interacting functional units as shown in FIG. 2. These functional units, discussed in greater detail below, perform the functions of fetching instructions and data from memory, decoding fetched instructions, scheduling instructions to be executed, executing the instructions, managing memory transactions, and interfacing with external circuitry and devices.

Figure 3:
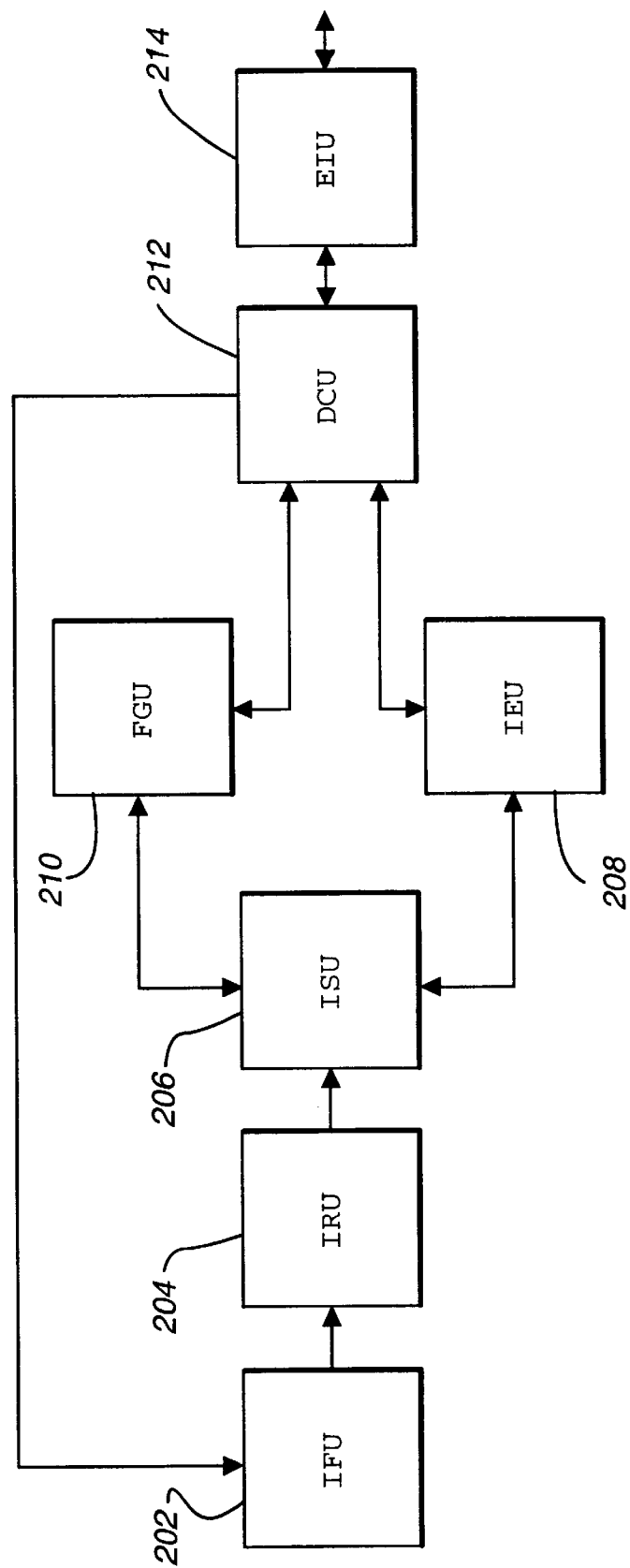
FIG. 3 shows a processor in block diagram form in accordance with one embodiment of the present invention.

The present invention is described in terms of apparatus and methods particularly useful in a highly pipeline and super scalar processor 102 shown in block diagram form in FIG. 2 and FIG. 3. The particular examples represent implementations that can be used to issue and execute multiple instructions per cycle and are amenable to high clock frequency operations. However, it is expressly understood that the inventive features of the present invention may be usefully embodied in a number of alternative processor architectures that will benefit from the performance features of the present invention. Accordingly, these alternative embodiments are equivalent to the particular embodiments shown and described herein.

FIG. 2 shows a typical general purpose computer system 100 incorporating a processor 102 in accordance with the present invention. Computer system 100 in accordance with the present invention comprises an address/data bus 101 for communicating information, processor 102 coupled with bus 101 through input/output (I/O) interface 103 for processing data and executing instructions, and memory system 104 coupled with bus 101 for storing information and instructions for processor 102. Memory system 104 comprises, for example, cache memory 105 and main memory 107. As will be described below, cache memory 105 includes one or more levels of cache memory. In a typical embodiment, processor 102, I/O interface 103, and some or all of cache memory 105 may be integrated in a single integrated circuit, although the specific components and integration density are a matter of design choice selected to meet the needs of a particular application.

User I/O devices 106 are coupled to bus 101 and are operative to communicate information in appropriately structured form to and from the other parts of computer 100. User I/O devices may include a keyboard, mouse, card reader, magnetic or paper tape, magnetic disk, optical disk, or other available devices, including another computer. Mass storage device 117 is coupled to bus 101, and may be implemented using one or more magnetic hard disks, magnetic tapes, CDROMs, large banks of random access memory, or the like. A wide variety of random access and read only memory technologies are available and are equivalent for purposes of the present invention. Mass storage 117 may include computer programs and data stored therein. Some or all of mass storage 117 may be configured to be incorporated as a part of memory system 104.

In a typical computer system 100, processor 102, I/O interface 103, memory system 104, and mass storage device 117, are coupled to bus 101 formed on a printed circuit board and integrated into a single housing as suggested by the dashed-line box 108. However, the particular components chosen to be integrated into a single housing is based upon market and design choices. Accordingly, it is expressly understood that fewer or more devices may be incorporated within the housing suggested by dashed line 108.

Display device 109 is used to display messages, data, a graphical or command line user interface, or other communications with the user. Display device 109 may be implemented, for example, by a cathode ray tube (CRT) monitor, liquid crystal display (LCD) or any available equivalent.

FIG. 3 illustrates the principle components of processor 102 in greater detail in block diagram form. It is contemplated that processor 102 may be implemented with more or fewer functional components and still benefit from the apparatus and methods of the present invention unless expressly specified herein. Also, functional units are identified using a precise nomenclature for ease of description and understanding, but other nomenclature often is used to identify equivalent functional units.

Instruction fetch unit (IFU) 202 comprises instruction fetch mechanisms and includes, among other things, an instruction cache for storing instructions, branch prediction logic, and address logic for addressing selected instructions in the instruction cache. The instruction cache (I$) is commonly referred to as a portion of the level one cache (L1$), with another portion of the Lc cache dedicated to data storage (D$). IFU 202 fetches one or more instructions at a time by appropriately addressing the instruction cache. The instruction cache feeds addressed instructions to instruction rename unit (IRU) 204. Preferably, IFU 202 fetches multiple instructions each cycle, and in a specific example fetches eight instructions each cycle.

In the absence of a branch instruction, IFU 202 addresses the instruction cache sequentially. The branch prediction logic in IFU 202 handles branch instructions, including unconditional branches. An outcome tree of each branch instruction is formed using any of a variety of available branch prediction algorithms and mechanisms. More than one branch can be predicted simultaneously by supplying sufficient branch prediction resources. After the branches are predicted, the address of the predicted branch is applied to the instruction cache rather than the next sequential address.

IRU 204 comprises one or more pipeline stages that include instruction renaming and dependency checking mechanisms. The instruction renaming mechanism is operative to map register specifiers in the instructions to physical register locations and to perform register renaming to minimize dependencies. IRU 204 further comprises dependency checking mechanisms that analyze the instructions fetched by IFU 202 amongst themselves, and against those instructions installed in ISU 206, to establish true dependencies. IRU 204 outputs renamed instructions to instruction scheduling unit (ISU) 206.

Program code may contain complex instructions, also called "macroinstructions", from the running object code. It is desirable in many applications to break these complex instructions into a plurality of simple instructions or "macroinstructions" to simplify and expedite execution. In a specific implementation, the execution units are optimized to precisely handle instructions with a limited number of dependencies using a limited number of resources (e.g., registers). Complex instructions include any instructions that require more than the limited number of resources or involve more than the limited number of dependencies. IRU 204 includes mechanisms to translate or expand complex instructions into a plurality of macroinstructions. These macroinstructions are executed more efficiently in the execution units (e.g., floating point and graphics execution unit (FGU) 210 and integer execution unit (IEU) 208), than could the macroinstructions.

ISU 206 receives renamed instructions from IRU 204 and registers them for execution. Upon registration, instructions are deemed "live instructions" in a specific example. ISU 206 is operative to schedule and dispatch instructions as soon as their dependencies have been satisfied into an appropriate execution unit (e.g., integer execution unit (IEU) 208, or floating point and graphics unit (FGU) 210). ISU 206 also maintains trap status of live instructions. ISU 206 may perform other functions such as maintaining the correct architectural state of processor 102, including state maintenance when out-of-order instruction issue logic is used. ISU 206 may include mechanisms to redirect execution appropriately when traps or interrupts occur and to ensure efficient execution of multiple threads where multiple threaded operation is used. Multiple thread operation means that processor 102 is running multiple substantially independent processes simultaneously. Multiple thread operation is consistent with but not required by the present invention.

ISU 206 also operates to retire executed instructions when completed by IEU 208 and FGU 210. ISU 206 performs the appropriate updates to architectural register files and condition code registers upon complete execution of an instruction. ISU 206 is responsive to exception conditions and discards or flushes operations being performed on instructions subsequent to an instruction generating an exception in the program order. ISU 206 quickly removes instructions from a misprinted branch path and initiates IFU 202 to fetch from the correct branch address. An instruction is retired when it has finished execution and all older instructions have retired. Upon retirement the instruction's result is written into the appropriate register file and it is no longer deemed a "live instruction".

IEU 208 includes one or more pipelines, each pipeline comprising one or more stages that implement integer instructions. IEU 208 also includes mechanisms for holding the results and state of speculatively executed integer instructions. IEU 208 functions to perform final decoding of integer instructions before they are executed on the execution units and to determine operand bypassing amongst instructions concurrently in execution on the processor pipelines. IEU 208 executes all integer instructions including determining correct virtual addresses for load/store instructions. IEU 208 also maintains correct architectural register state for a plurality of integer registers in processor 102. IEU 208 preferably includes mechanisms to access single and/or double precision architectural registers as well as single and/or double precision rename registers.

FGU 210 includes one or more pipelines, each comprising one or more stages that implement floating point instructions. FGU 210 also includes mechanisms for holding the results and state of speculatively executed floating point and graphics instructions. FGU 210 functions to perform final decoding of floating point instructions before they are executed on the execution units and to determine operand bypassing amongst instructions concurrently in execution on the processor pipelines. In the specific example, FGU 210 includes one or more pipelines dedicated to implementing special purpose multimedia and graphics instructions that are extensions to standard architectural instructions for a processor. FGU 210 may be equivalently substituted with a floating point unit (FPU) in designs in which special purpose graphics and multimedia instructions are not used. FGU 210 preferably includes mechanisms to access single and/or double precision architectural registers as well as single and/or double precision rename registers.

A data cache memory unit (DCU) 212 shown in FIG. 3, including cache memory 105 shown in FIG. 2, functions to buffer memory reads from off-chip memory through external interface unit (EIU) 214. Optionally, DCU 212 also buffers memory write transactions. DCU 212 can comprise, in one example, two hierarchical levels of cache memory on-chip (L1$ and L2$) and a third cache level (L3$) accessible through EIU 214.

Figure 4:
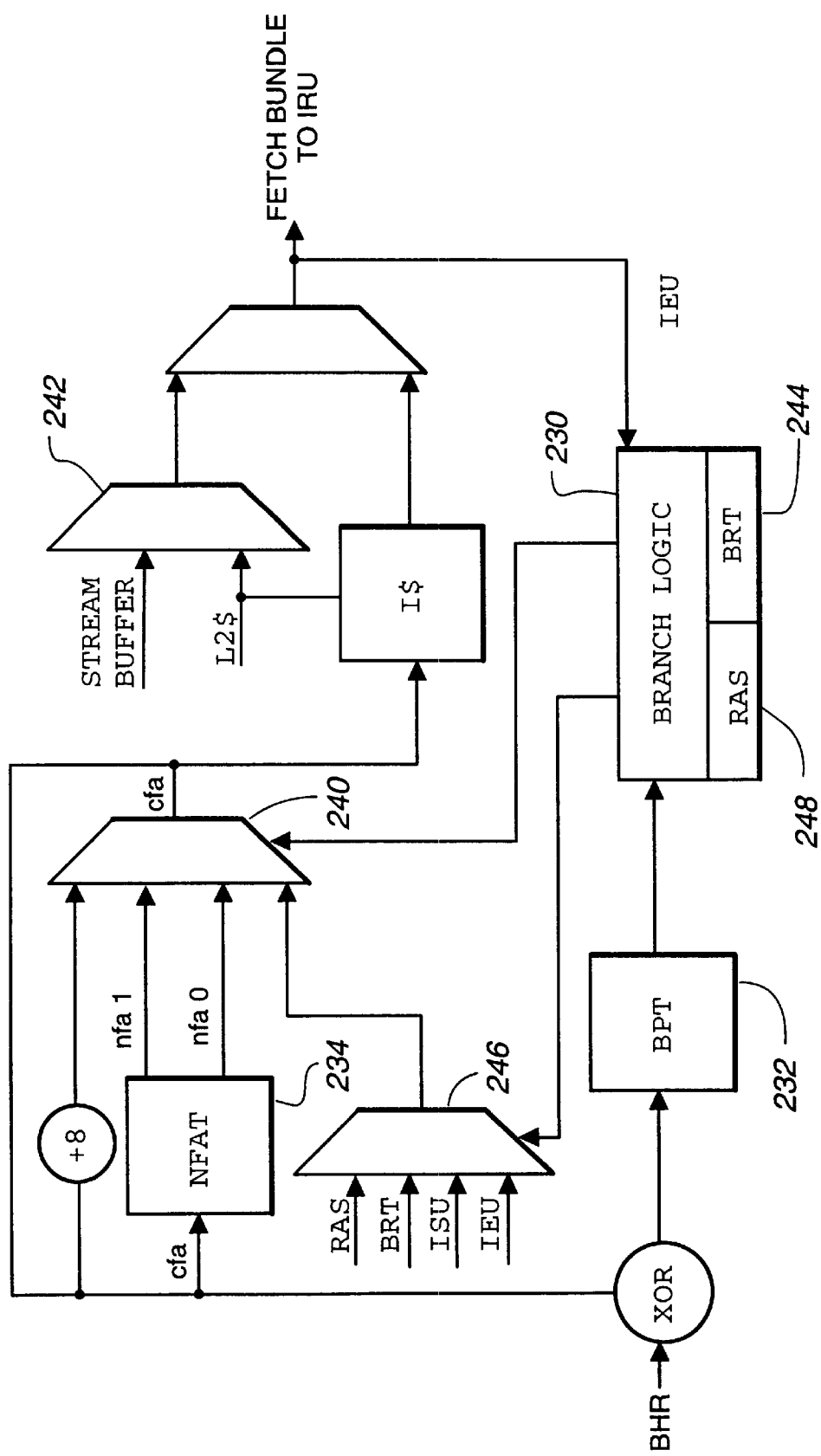
FIG. 4 illustrates in block diagram form an instruction fetch unit with branch prediction in accordance with one embodiment of the present invention.

FIG. 4 illustrates the instruction fetch unit (IFU) 202 in greater detail. IFU 202 comprises instruction fetch mechanisms and includes, among other things, an instruction cache I$ for storing instructions, branch prediction logic 230, a branch prediction table 232, a next fetch address table (NFAT or NFT) 234, and logic for addressing selected instructions in the instruction cache I$.

IFU 202 fetches one or more instructions each clock cycle by appropriately addressing the instruction cache I$ via MUX 240 and MUX 242 under the control of branch logic 230 shown in FIG. 4. In the absence of a conditional branch instruction, IFU 202 addresses the instruction cache I$ sequentially. Fetched instructions are passed to IRU 204 shown in FIG. 3. A fetch bundle may include multiple control-flow (i.e., conditional or unconditional branch) instructions. Hence, IFU 202 desirably bases the next fetch address decision upon the simultaneously predicted outcomes of multiple branch instructions, as will be described below.

The branch prediction logic 230 and table 232 handle branch instructions, including unconditional branch instructions. In one example, an outcome for each branch instruction is predicted using a variety of available branch prediction algorithms and mechanisms, along with the inventive techniques disclosed herein. In the example shown in FIG. 4, an exclusive-OR operation is performed on the current fetch address (cfa) And a value from a selected branch history register (BHR) to generate an index to the branch prediction table 232. The BHR comprises information about the outcomes of a pre-selected number of most-recently executed conditional and unconditional branch instructions, and an outcome can be represented as taken or not taken.

In accordance with the present invention and as will be described below with reference to FIG. 5, the next fetch address table (NFT or NFAT) 234 uses two-cycles to generate the next fetch address. The branch prediction table 232 provides updated information every cycle that will be used to select information from the NFT 234 in every cycle of the two cycle access. Consequently, an instruction cache access can occur every cycle based on an address obtained from the NFT 234.

When a conditional branch instruction is predicted, the predicted outcome is used to speculatively update the appropriate BHR so that the outcome will be part of the information used by the next access to BPT 232. When a branch is misprinted, however, the appropriate BHR must be repaired by transferring the BHR value from a branch repair table BRT 244, along with the actual outcome of the misprinted branch loaded into the BHR.

The NFT 234 determines the next fetch address based upon the current fetch address (cfa) Received from the output of MUX 246. For example, the NFT may comprise 2048 entries, each of which comprises two multi-bit values corresponding to a predicted address for instructions in two-halves of the current fetch bundle, shown as nfa0 and nfa1 in FIG. 4 and in FIG. 6. It is understood that, depending upon the particular implementation, more next fetch addresses beyond nfa1, nfa0 could be used if desired.

Figure 6:
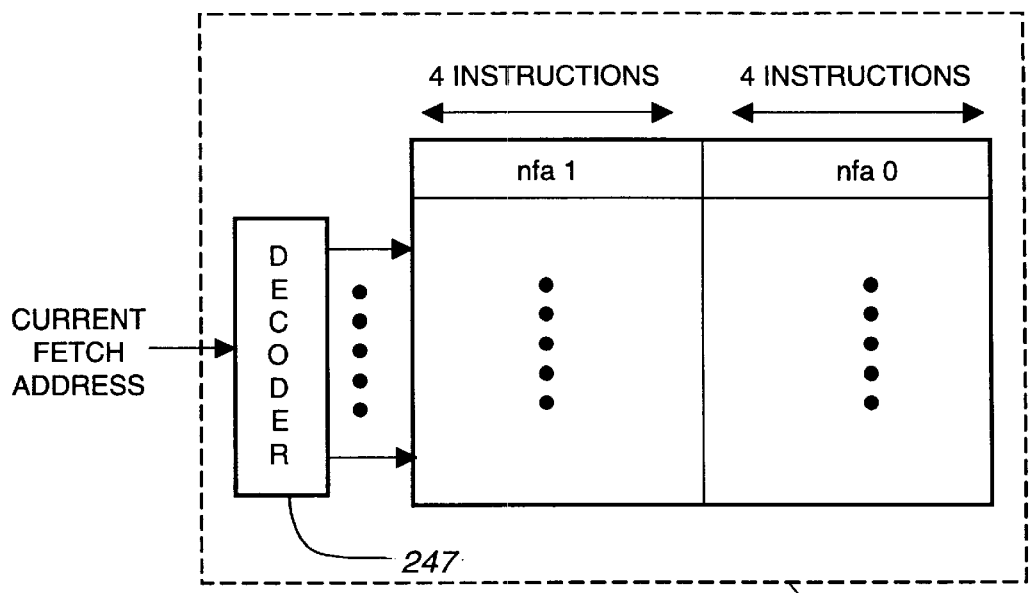
FIG. 6 illustrates in block diagram form an array structure for the next fetch address table (NFT) in accordance with one embodiment of the present invention.

As shown in FIG. 6, each row of the NFT corresponds to a single fetch bundle, and each column corresponds to four instructions (shown as nfa1 and nfa0). The nfa1, nfa0in FIG. 6 are each mapped to any branch instruction within a set of four sequentially located instructions. It is understood that this mapping is a matter of choice depending upon cost and performance and can be altered with different levels of granularity as desired. FIG. 6 also shows that the NFT 234 can have decoding logic for decoding the current fetch address to point to the proper nfa1/nfa0 pair in the NFT. In one example, the multi-bit values nfa1/nfa0 can include set prediction for the next fetch, along with an index to the instruction cache I$.

Figure 9:
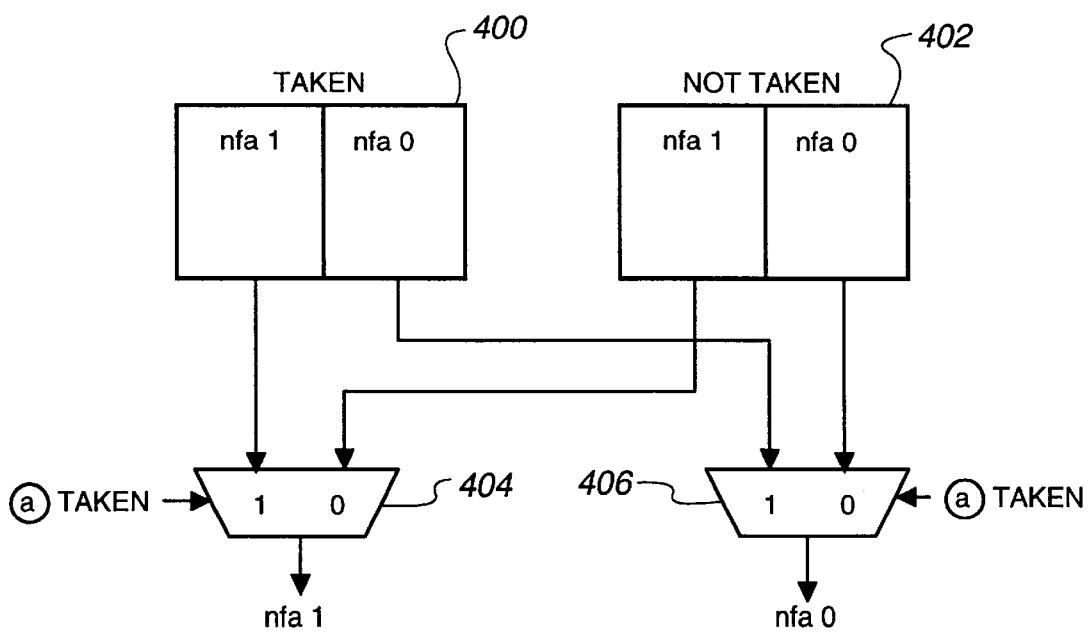
FIG. 9 illustrates in block diagram form a hardware structure for implementing the decision tree of FIG. 8 in accordance with one embodiment of the present invention.
Figure 11:
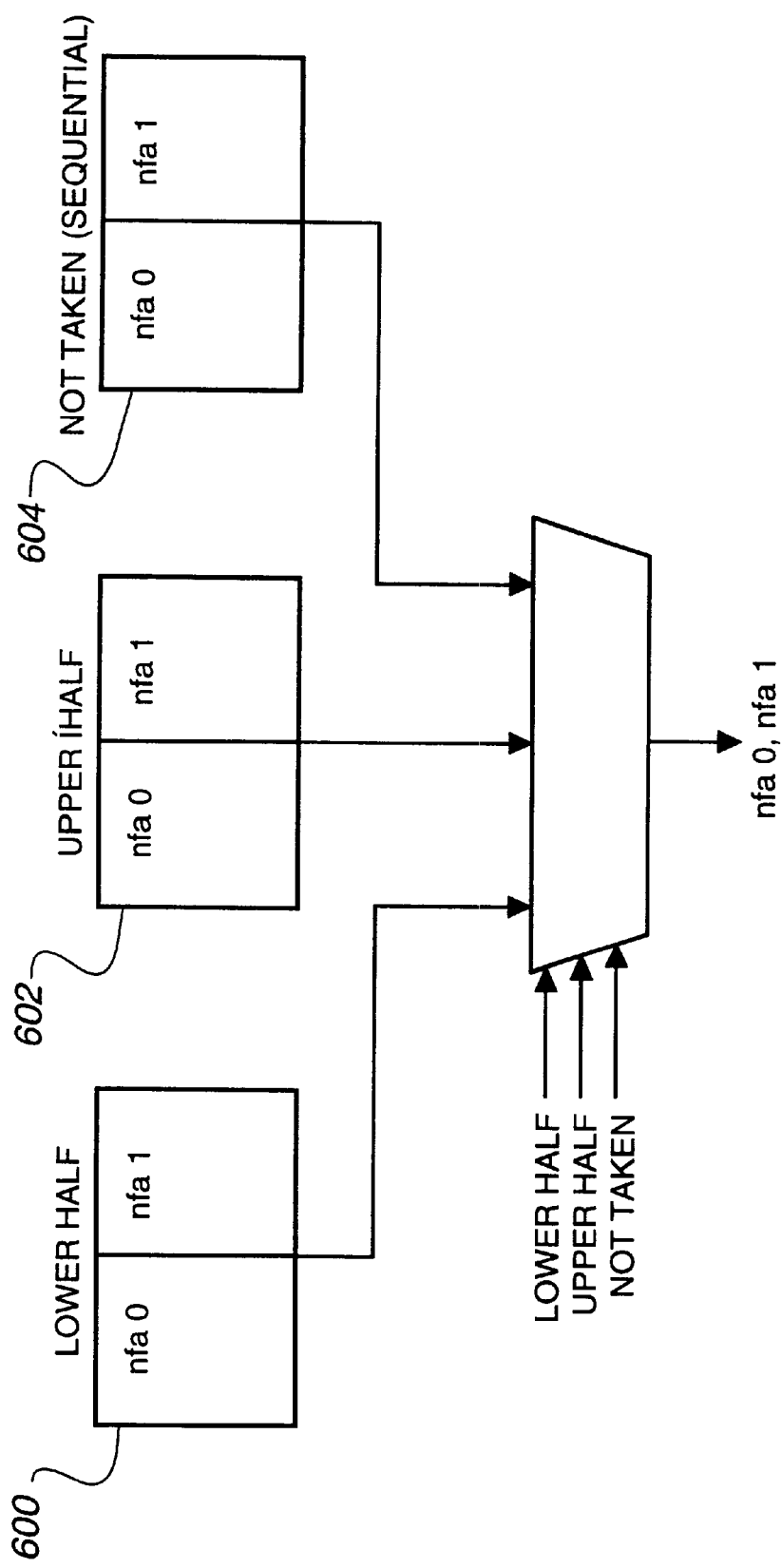
FIG. 11 illustrates in block diagram form a hardware structure for implementing the decision tree of FIG. 10 in accordance with one embodiment of the present invention.

In accordance with the present invention, novel structures for the NFT 234 are shown in FIGS. 9 and 11 and are explained below in greater detail.

The branch repair table (BRT) 244 comprises entries or slots for a number of unresolved branch instructions, in one example. The BRT 244 determines when a branch instruction is misprinted based upon information from IEU 208, for example. BRT 244, operating through the branch logic, redirects IFU 202 down the correct branch path.

Once a branch is resolved, the address of the path this branch actually follows is communicated from IEU 208 and compared against the predicted path address. If these two addresses differ, those instructions down the misprinted path are flushed from the processor and the IFU 202 redirects the instruction fetch from the instruction cache I$ down the correct path using the BRT input into the MUX 246.

In one example, a return address stack (RAS) 248 can be used to contain the return addresses of the eight most recently executed branch and control transfer instructions, and whenever a "call", "link", "jump" or similar instruction is executed, the program counter can be pushed onto the RAS. When a subsequent "return" instruction is executed, the program counter value on the top of the RAS is popped, and the IFU 202 begins to fetch the instructions at this address.

In accordance with the present invention, the novel structures and methods for the NFT 234 will now be described. As discussed above, the NFT stores next fetch addresses which could be branch targets or sequential addresses, and supplies the appropriate predicted branch addresses for use by the address generation portion of the processor. In one example and in accordance with the present invention, the NFT will have a latency of two cycles, such that the decision as to the next fetch address is split over two cycles. FIG. 5 illustrates the coordination of addresses and instruction cache access steps where the address generation step occurs over two cycles, and the instruction cache access step also occurs over two cycles. In accordance with short cycle time and high frequency pipeline operation of a processor of the present invention, a step of generating an instruction address is commenced every cycle.

Referring to cycle 2, the address generation step for fetch bundle "z" is spread over cycles 2 and 3 and shown as steps $A_{0z}$ and $A_{1z}$. At the beginning of cycle 3, the address generation step for fetch bundle "a" commences through cycles 3 and 4 as shown by steps $A_{0af}$ and $A_{1a}$. Cycles 4 and 5 show the address generation steps for fetch bundle "b", shown as $A_{0b}$ and $A_{1b}$.

When cycle 3 is complete, the fetch address for fetch bundle "z" has been calculated and fetch bundle "z" is obtained from the instruction cache over cycles 4 and 5. However, when cycle 3 is complete, the address generation steps for fetch bundle "a" have already commenced, since the processor utilizes pipe lining to achieve a throughput of one fetch bundle per cycle. Similarly, when cycle 4 is complete and the fetch address for fetch bundle "a" has been calculated, the address generation steps for fetch bundle "b" have already commenced.

Accordingly, if fetch bundle "a" introduced an instruction resulting in a taken branch, then the predicted and generated addresses for the instructions in fetch bundle "b" beginning at cycle 4 may be inaccurate. This is because under ideal circumstances "z", not "x", should be used to predict "a". Likewise, if fetch bundle "b" introduced an instruction resulting in a taken branch, then the predicted and generated addresses for the instructions in fetch bundle "c" beginning at cycle 5 may be inaccurate.

The NFT stores next fetch addresses (nfa) associated with a cache line. In one example, two branch addresses are stored, and referred to herein as nfa1 and nfa0. Over a single cycle, three addresses are required: a sequential address (representing the address if no branch is taken), nfa1 and nfa0. It follows that over two cycles, nine addresses would be required. Over three cycles, 27 addresses would be required to be stored for a specific index into the NFT.

Figure 5:
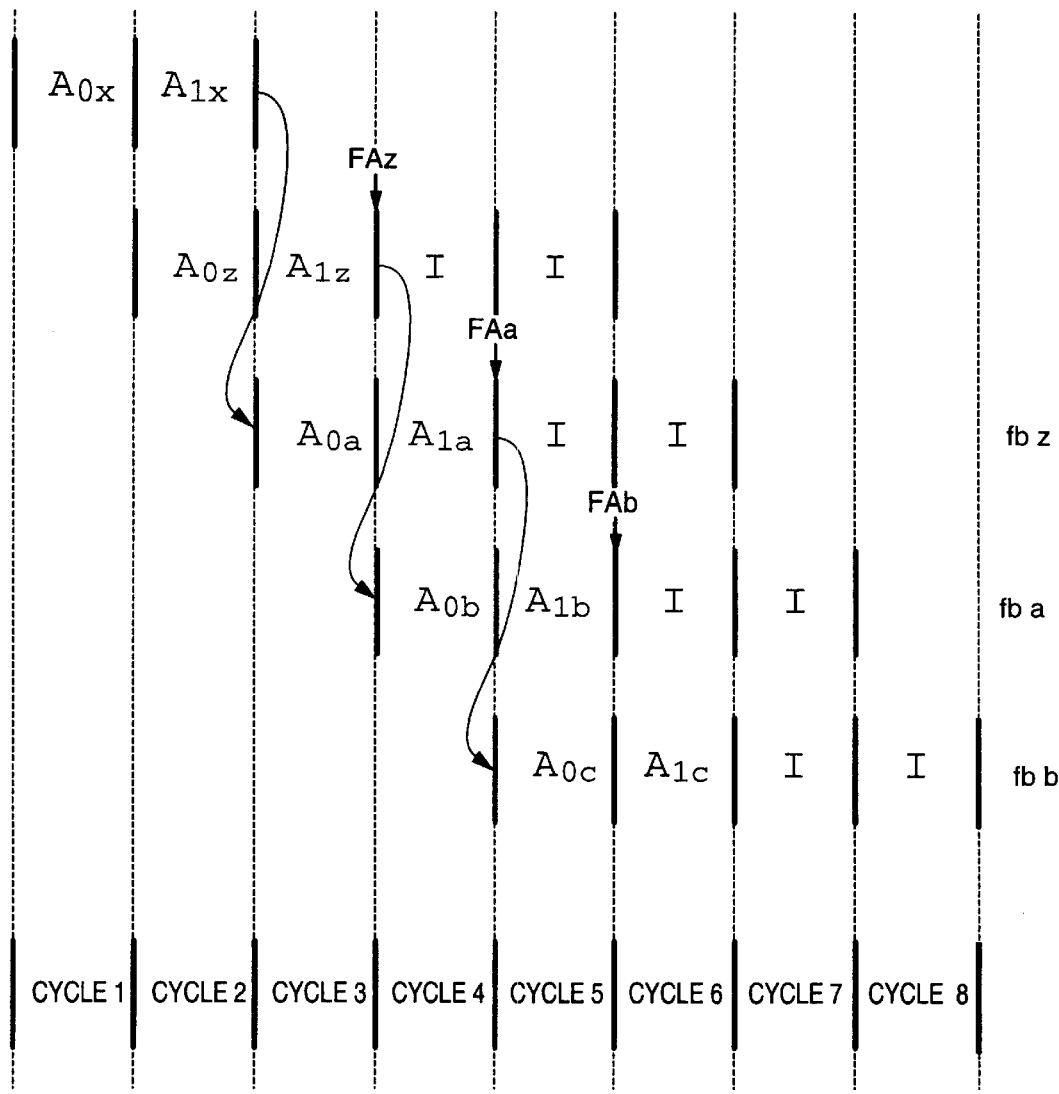
FIG. 5 illustrates the address generation steps (2 cycles/bundle) and instruction cache access steps (2 cycles/bundle) to obtain a plurality of instruction fetch bundles over eight cycles of a microprocessor, in accordance with one embodiment of the present invention.
Figure 7A:
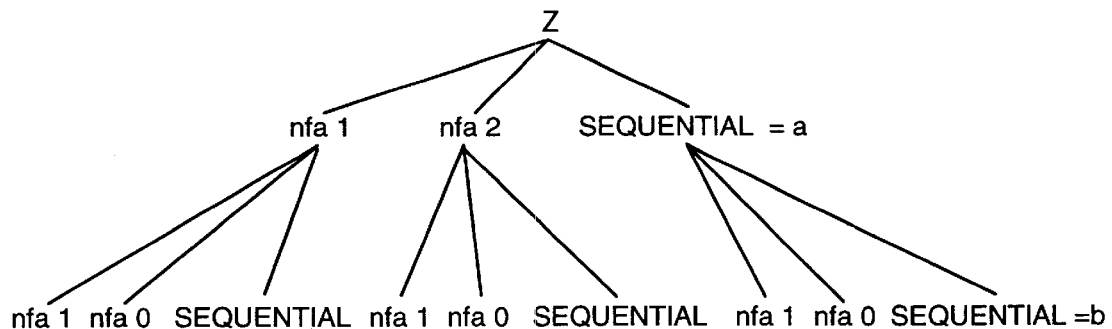
FIG. 7A illustrates a tree structure showing the nine possible addresses which can be predicted after a two cycle address generation step.

Stated differently, because an address generation/prediction completed every two cycles as shown in FIG. 5, there are a greater number of possible next fetch addresses which correspond to a particular current fetch address. This effect is shown in FIG. 7A, where a tree structure shows the nine possible addresses which can be predicted after a two cycle address generation step. The current fetch address is shown as "z". Although the NFT completes the address generation process every 2 cycles, the NFT does generate addresses every cycle in a pipeline manner. For each address presented to the NFT, the NFT generated nfa1 (next fetch address 1), nfa0 (next fetch address 0), and sequential address (branch not taken). As can be seen in FIG. 7A, after two cycles, there are nine possible predicted addresses which correspond to the current fetch address "z". Accordingly, after a two cycle address generation step, because of aliasing there are a greater number of possible predicted addresses to choose from, which may increase the likelihood that a branch misdirection may occur.

Figure 7B:
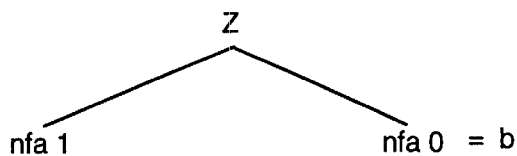
FIG. 7B shows a tree structure of a single cycle implementation if no branch history is used.

FIG. 7B shows a tree structure if the NFT is implemented without branch history. Fetch address "b" would have to be stored in nfa1, nfa0. So from FIG. 7A, there are three nfa1's from FIG. 7A which can alias to nfa1 in FIG. 7B. There are also three nfa0's from FIG. 7A which can alias to nfa0 in FIG. 7B. Depending on which is chosen, there are three sequential addresses from FIG. 7A which alias to either of nfa1, nfa0 of FIG. 7B. Accordingly, this aliasing reduces the accuracy of prediction.

FIGS. 8–11 illustrate embodiments of the present invention which can be implemented in NFT to address this problem.

In a preferred embodiment, shown in FIGS. 8–11, the present invention utilizes branch history information (i.e. Whether a branch was taken or not taken) in order to help determine and predict the next fetch addresses. In particular, the branch history information is derived from intermediate fetch bundles to help predict the next fetch addresses.

Figure 8:
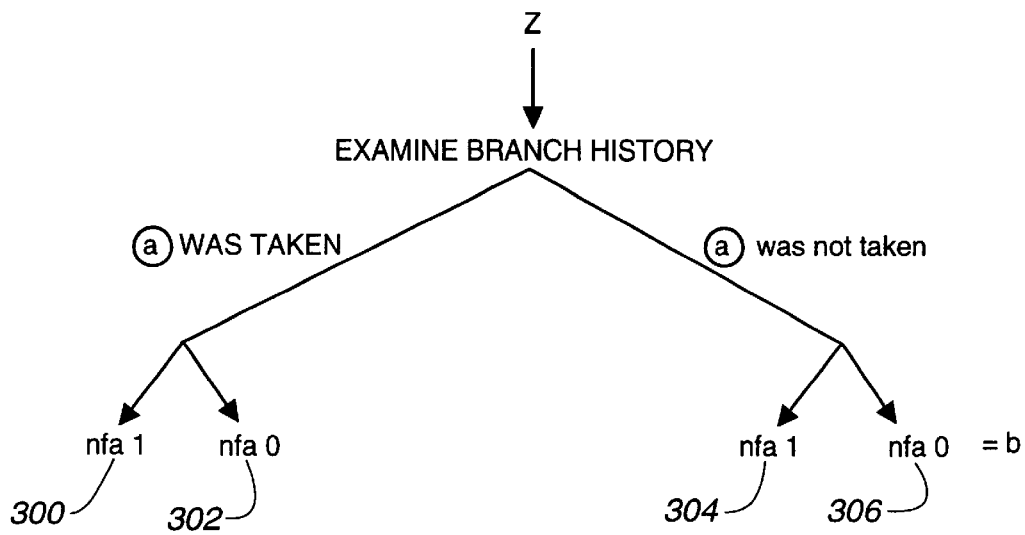
FIG. 8 illustrates a decision tree utilized by one embodiment of the present invention in order to reduce the possibilities of branch misdirections.

FIG. 8 illustrates a preferred embodiment of the present invention, wherein a decision tree is utilized to reduce the degree of aliasing in a processor with a multi-cycle NFT. As shown, from a current fetch address for an instruction "z", information as to whether a branch/control transfer instruction from an intermediate fetch bundle "a" was, or was not, taken is used to determine the next fetch addresses for fetch bundle "b". These fetch addresses for fetch bundle "b" will be selected depending upon whether the CTI (control transfer instruction) was present in NFA1 or NFA0 of the fetch bundle "a".

As shown in FIG. 8, starting with an instruction "z", if a branch/CTI from bundle "z" was taken, then the predicted next fetch addresses are nfa1 and nfa0, shown as 300 and 302. However, if a branch/control transfer instruction in fetch bundle "a" was not taken, then the predicted next fetch addresses are nfa1 and nfa0, shown as 304 and 306. Therefore, instead of nine possible next fetch addresses (as previously shown in FIG. 7A), four next fetch addresses 300, 302, 304, and 306 are provided in accordance with the present invention. Accordingly, the amount of aliasing is reduced.

In particular, the selection process is as follows. The nfa1 300 is selected if "a" was taken and "b" is in the upper half of fetch bundle "a". The nfa0 302 is selected if "a" was taken and "b" is in the lower half of fetch bundle "a". The nfa1 304 is selected if "a" was not taken and "b" is in the upper half of fetch bundle "a". The nfa0 306 is selected if "a" was not taken and "b" is in the lower half of fetch bundle "a".

Aliasing is reduced as shown by comparing FIG. 8 to FIG. 7A. When "a" was taken, two nfa1's of FIG. 7A map to one nfa1 of FIG. 8; two nfa0's of FIG. 7A map to one nfa0 of FIG. 8; and two sequential of FIG. 7A map to either of nfa1 or nfa0 of FIG. 8. When "a" was not taken, one nfa1 of FIG. 7A maps to one nfa1 of FIG. 8; one nfa0 maps to one nfa0, and one sequential of FIG. 7A maps to either nfa1 or nfa0 of FIG. 8. This particular mapping is logically dictated by the fact that there is always a (not taken)/(taken) path for the intermediate fetch address.

Therefore, an improvement in performance of the processor can be achieved by reducing aliasing from all possible next fetch addresses after two cycles of address generation, thereby reducing the probability of taking a misprinted branch. In this way, by using branch history information (i.e., whether or not a branch from an intermediate fetch bundle was taken or not taken) the decision-making for prediction is improved.

FIG. 9 illustrates one embodiment of an architecture for an NFT in accordance with the present invention to implement the decision tree shown in FIG. 8. In FIG. 9, two tables or data arrays 400, 402 containing taken and not taken information are provided. Each table 400,402 stores nfa1 and nfa0 corresponding to the output of address generation for the current fetch address of instruction "z". Multiplexers or selectors 404, 406 are used with a select line coupled to the branch history information as to whether a branch instruction in the intermediate fetch bundle "z" (which supplies "a") was taken or not. In this manner, nfa1 and nfa0 can be selected using the branch history information as described above.

While the invention has been shown with respect to an NFT, the invention could be applied to a branch prediction table BPT (FIG. 4) or to any multi-cycle structure which stores or has access to information regarding the branches taken or not taken. Further, the invention could be also utilized with a system where three cycle address generation is used, where there are two intervening addresses between the present address and the predicted address. In other words, the invention could be stretched over multiple cycles and incorporated in a processor where address generation occurs over more than two cycles.

Figure 10:
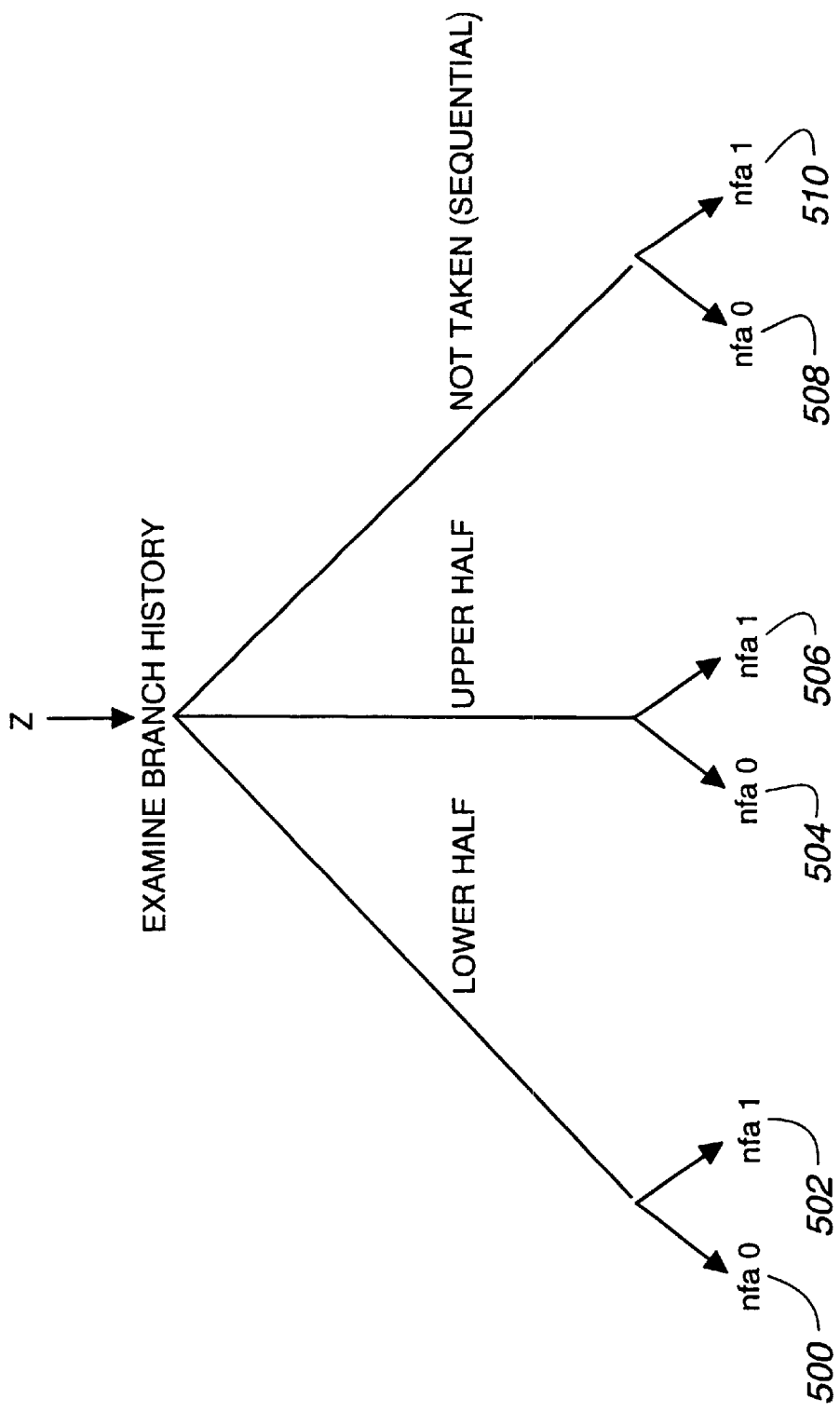
FIG. 10 illustrates an alternative decision tree utilized by one embodiment of the present invention in order to reduce the possibilities of branch misdirections.

FIG. 10 illustrates an alternative decision tree utilized by one embodiment of the present invention in order to reduce the possibilities of branch misdirections. Branch history information (i.e., whether or not a branch was taken or not taken) is used in order to help determine and predict the next fetch addresses. In particular, the branch history information is derived from whether a branch/control transfer instruction from an intermediate fetch bundle was taken, either from the upper half or lower half of the bundle, or no branch/control transfer instructions from an intermediate fetch bundle were taken (i.e., sequential operation).

As shown in FIG. 10, from a current fetch address for an instruction "z", information as to whether a branch/control transfer instruction from the upper half or lower half of an intermediate fetch bundle "a" was, or was not, taken is used to determine the next fetch addresses for fetch bundle "b". Starting with an instruction "z", if a branch/control transfer instruction from the lower half of bundle "a" was taken, then the predicted next fetch addresses are nfa1 and nfa0, shown as 500 and 502. If a branch/control transfer instruction from the upper half of bundle "a" was taken, then the predicted next fetch addresses are nfa1 and nfa0, shown as 504 and 506.

However, if no branch/control transfer instructions in fetch bundle "a" were taken, then the predicted next fetch addresses are nfa1 and nfa0, shown as 508 and 510. Therefore, instead of nine possible next fetch addresses (as previously shown in FIG. 7A), six next fetch addresses 500, 502, 504, 506, 508, and 510 are provided in accordance with the present invention, which reduces aliasing.

In particular, the process to select is as follows. nfa0 500 or nfa1 502 is selected if "a" is taken and "a" is in the upper half of fetch bundle "z". nfa0 500 is chosen if "b" is in the lower half of fetch bundle "a". nfa1 502 is chosen if "b" is in the upper half of fetch bundle "a". nfa0 500 is written with an updated target address if "a" was in the lower half of fetch bundle "z", and if "b" was in the lower half of fetch bundle "a". The process can be similarly extended to the other portions of the decision tree of FIG. 10.

Therefore, an improvement in performance of the processor can be achieved by reducing aliasing from all possible next fetch addresses after two cycles of address generation, thereby reducing the probability of taking a misprinted branch. In this way, by using branch history information (i.e. Whether or not a branch from an intermediate fetch bundle was taken or not taken) the decision-making for prediction is improved.

FIG. 11 illustrates an embodiment of an architecture for an NFT in accordance with the present invention to implement the decision tree shown in FIG. 10. In FIG. 11, three tables or data arrays 600, 602, and 604 are provided, each table 600, 602, and 604 storing nfa1 and nfa0 addresses corresponding to the output of address generation for the current fetch address of instruction "z". The table 600 stores nfa1/nfa0 addresses where a branch/control transfer instruction from the lower half of bundle "a" was taken; table 602 stores nfa1/nfa0 addresses where a branch/control transfer instruction from the upper half of bundle "a" was taken; and table 604 stores nfa1 /nfa0 addresses where no branch/ control transfer instructions from bundle "a" were taken.

A multiplexer or selector 606 is used with select lines coupled to the branch history information as to whether a branch instruction from the upper or lower half in the intermediate fetch bundle "a" was taken or not. In this manner, nfa1 and nfa0 can be selected using the branch history information.

While the method disclosed herein has been described and shown with reference to particular steps performed in a particular order, it will be understood that these steps may be combined, sub-divided, or re-ordered to form an equivalent method without departing from the teachings of the present invention. Accordingly, unless specifically indicated herein, the order and grouping of the steps is not a limitation of the present invention.

While the invention has been particularly shown and described with reference to a preferred embodiment thereof, it will be understood by those skilled in the art that various other changes in the form and details may be made without departing from the spirit and scope of the invention. For instance, while the present invention has been described with reference to a processor architecture shown in FIG. 2, it will be understood that the present invention could be used in other equivalent processor designs.

What is claimed is:

1. An instruction fetch unit for fetching instructions from an instruction cache of a processor, comprising:
  a next fetch address mechanism generating predicted next fetch addresses, the next fetch address mechanism generating a next fetch address for a fetch bundle over at least two cycles of the processor; or
  the next fetch address mechanism generating a next fetch address for a fetch bundle over at least three cycles of the processor when two intervening addresses are between a present address and the next fetch address;
  wherein said next fetch address mechanism determines said next fetch address based on whether a control transfer instruction from an intermediate set of fetched instructions is taken.

2. The instruction fetch unit of claim 1, wherein:
said fetch bundle comprises at least eight instructions.

3. A processor that executes coded instructions, comprising:
  an instruction fetch unit for fetching instructions from an instruction cache of a processor, the fetch unit including a next fetch address mechanism generating predicted next fetch addresses, the next fetch address mechanism generating a next fetch address for a fetch bundle over at least two cycles of the processor, or
  the next fetch address mechanism generating a next fetch address for a fetch bundle over at least three cycles of the processor when two intervening addresses are between a present address and the next fetch address;
  wherein said next fetch address mechanism determines said next fetch address based on whether a control transfer instruction from an intermediate set of fetched instructions is taken;
  an instruction scheduling unit receiving the coded instructions and issuing received instructions for execution; and
  an instruction execution unit generating data access requests in response to the issued instructions.

4. A computer system comprising:
  a processor formed on an integrated circuit chip, said processor including an instruction fetch unit for fetching instructions from an instruction cache of a processor, the fetch unit including a next fetch address mechanism generating predicted next fetch addresses, the next fetch address mechanism generating a next fetch address for a fetch bundle over at least two cycles of the processor, or
  the next fetch address mechanism generating a next fetch address for a fetch bundle over at least three cycles of the processor when two intervening addresses are between a present address and the next fetch address;
  wherein said next fetch address mechanism determines said next fetch address based on whether a control transfer instruction from an intermediate set of fetched instructions is taken;
  an instruction scheduling unit receiving the coded instructions and issuing received instructions for execution; and
  an instruction execution unit generating data access requests in response to the issued instructions.

5. An instruction fetch means for fetching instructions from an instruction cache of a processor, comprising:
  a next fetch address means for generating predicted next fetch addresses, the next fetch address means generating a next fetch address for a fetch bundle over at least two cycles of the processor; or
  the next fetch address means generating a next fetch address for a fetch bundle over at least three cycles of the processor when two intervening addresses are between a present address and the next fetch address;
  wherein said next fetch address means determines said next fetch address based on whether a control transfer instruction from an intermediate set of fetched instructions is taken.

6. The instruction fetch means of claim 1, wherein:
said fetch bundle comprises at least eight instructions.

7. A processor that executes coded instructions, comprising:
  an instruction fetch means for fetching instructions from an instruction cache of a processor, the fetch means including a next fetch address means for generating predicted next fetch addresses, the next fetch address means generating a next fetch address for a fetch bundle over at least two cycles of the processor, or
  the next fetch address means generating a next fetch address for a fetch bundle over at least three cycles of the processor when two intervening addresses are between a present address and the next fetch address;
  wherein said next fetch address means determines said next fetch address based on whether a control transfer instruction from an intermediate set of fetched instructions is taken;
  an instruction scheduling means for receiving the coded instructions and issuing received instructions for execution; and an instruction execution means for generating data access requests in response to the issued instructions.

8. A computer system comprising:

a processor formed on an integrated circuit chip, said processor including instruction fetch means for fetching instructions from an instruction cache of a processor, the fetch means including a next fetch address means for generating predicted next fetch addresses, the next fetch address means generating a next fetch address for a fetch bundle over at least two cycles of the processor, or the next fetch address means generating a next fetch address for the fetch bundle over at least three cycles of the processor when two intervening addresses are between a present address and the next fetch address;

wherein said next fetch address means determines said next fetch address based on whether a control transfer instruction from an intermediate set of fetched instructions is taken;

an instruction scheduling means for receiving the coded instructions and issuing received instructions for execution; and an instruction execution means for generating data access requests in response to the issued instructions.

* * * * *

UNITED STATES PATENT AND TRADEMARK OFFICE
CERTIFICATE OF CORRECTION

PATENT NO. : 6,330,662 B1  
DATED : December 11, 2001  
INVENTOR(S) : Sanjay Patel, Adam Talcott and Rajasekhar Cherabuddi It is certified that error appears in the above-identified patent and that said Letters Patent is hereby corrected as shown below:

<u>Title page,</u>  
Title, delete "MULTI-CYLCE" and substitute -- MULTI-CYCLE --

Signed and Sealed this

Twenty-first Day of May, 2002

Attest:

JAMES E. ROGAN  
*Attesting Officer*   *Director of the United States Patent and Trademark Office*